July 2, 1968
C. R. MILLER
3,390,622
COPY STATION
Filed Jan. 22, 1965
3 Sheets-Sheet 1
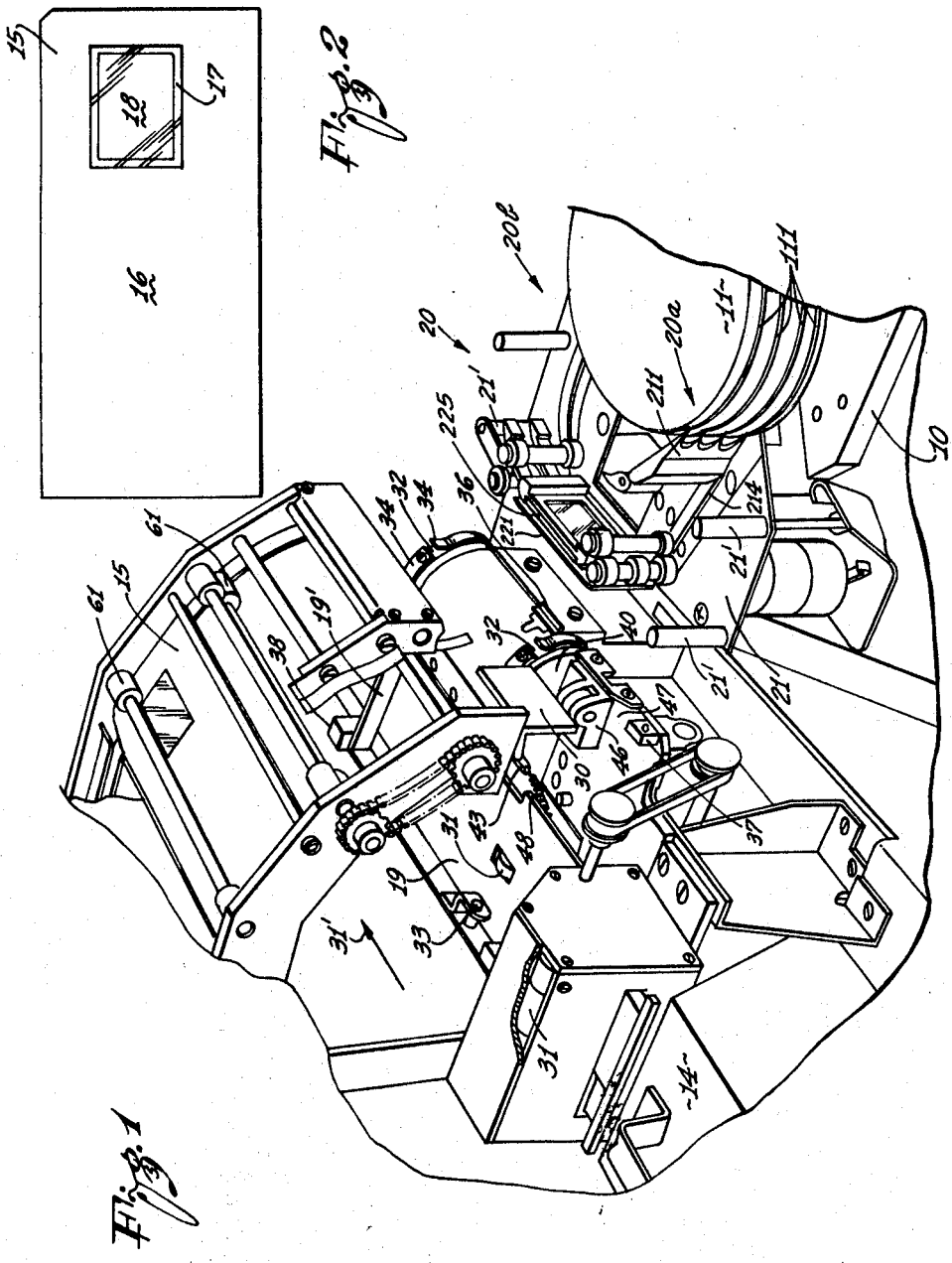
INVENTOR:
Clark R. Miller
Attorneys

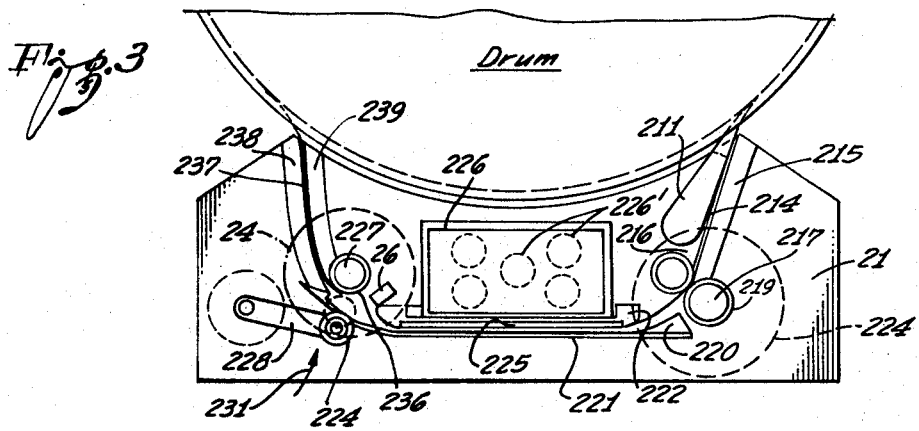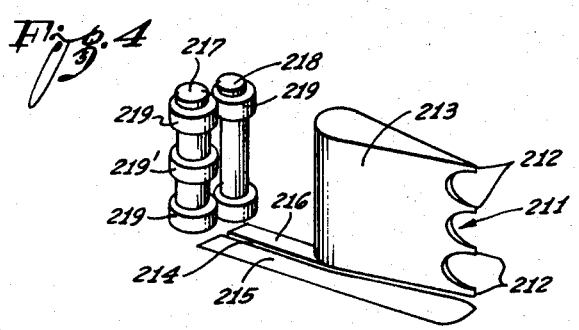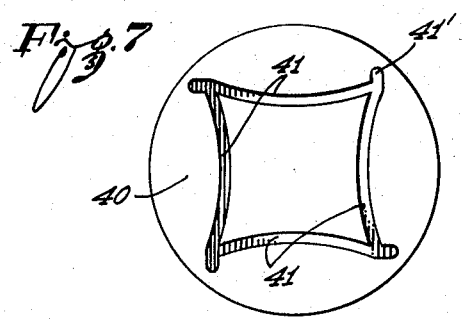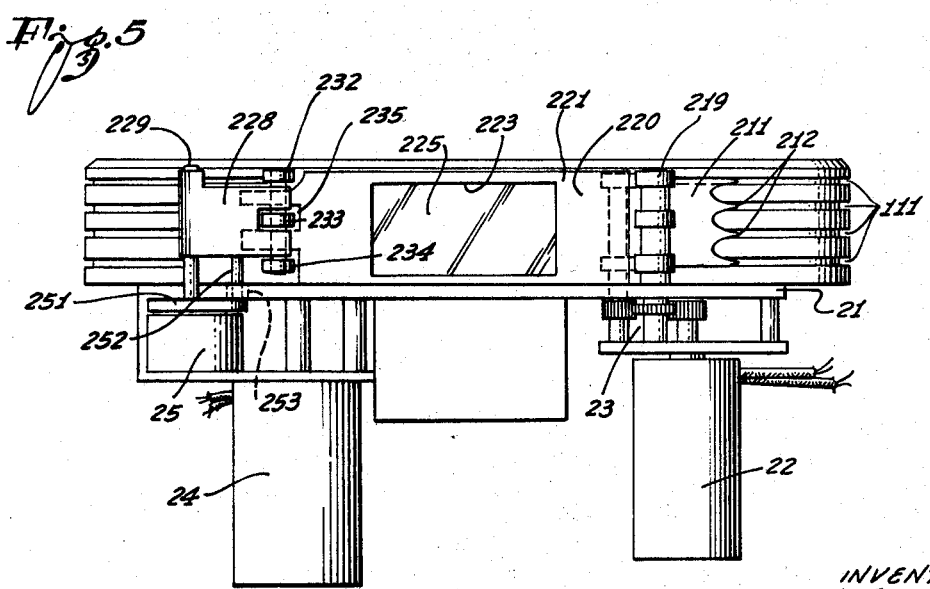
INVENTOR:
Clark R. Miller
Attorneys

July 2, 1968  C. R. MILLER  3,390,622
COPY STATION
Filed Jan. 22, 1965  3 Sheets-Sheet 3

INVENTOR:
Clark R. Miller

By Smyth, Roston & Pavitt
Attorneys

United States Patent Office 3,390,622
Patented July 2, 1968

3,390,622
COPY STATION
Clark R. Miller, Granada Hills, Calif., assignor to The Magnavox Company, Torrance, Calif., a corporation of Delaware
Filed Jan. 22, 1965, Ser. No. 427,345
26 Claims. (Cl. 95—73)

ABSTRACT OF THE DISCLOSURE

This invention relates to apparatus for copying an image on a first film chip to an unexposed film chip. The first film chip and the unexposed film chip are transferred to a copy station in image-copying relationship and means are then operated to obtain the copy of the image on the first film chip to the unexposed film chip. The first film chip and the unexposed film chip are then transferred from the copy station.

The first film chip may be continuously transported in a closed loop before becoming transferred to the copy station. Means are provided for effectuating such transfer and for stopping the first film chip in the copy station at the image-copying position. Means are also provided for transferring the first film chip from the copy station to the transport means after the copy of the image on the unexposed film chip.

The unexposed film chip may be transferred to the copy station and may then be pivoted to the image-copying position. Upon the transfer of the image to the unexposed film chip, the unexposed film chip may be pivoted from the image-copying position and transferred from the station.

---

The present invention relates to a copy station which permits the transfer of an image on a film chip onto an unexposed film chip mounted in a window of an otherwise regular punched card of the type used in data processing systems.

The handling and storing of information of any kind presents an increasing problem in view of the rapidly increasing amount of information to be handled. One significant solution to this problem is the employment of photographic films on which images are produced to store information on a drastically reduced scale but in a discernible manner which permits reproduction and enlargement without loss of the information and when needed. For example, large scale drawings, volumes of records and reports are photographed on microfilm and individual film chips are individually stored in cartridges. It is apparent that the quantity of information which can be stored in the given space is larger by several orders of magnitude as compared with original drawings, normally typed or printed pages of reports, books, pamphlets, etc. The storage on microfilm further has the advantage that it permits combination of analog and digital information to appear on one image in juxtaposed positions with the digital information, for example, being an identifying code for the analog information.

Equipment has been suggested and is known to retrieve such film chips rapidly from their storage cartridges. Processing systems for film chips of this type are, for example, disclosed in Letters Patents 3,021,005; 3,023,-894; 3,023,895; 3,032,750 and 3,039,681 and others. The cartridges for the film chips of the type and character described above will preferably be located in a central file cabinet to be drawn upon when needed. Copending application Serial No. 410,628, now U.S. Patent No. 3,297,-379, discloses a file cabinet and a cartridge or magazine retrieval system of this nature. The above-mentioned patents specifically describe devices for retrieving individual chips from a magazine normally stored in such a file cabinet of the above-mentioned application. These patents further disclose systems according to which film chips can be transported individually to pass a reading station for read out, and subsequent transport of such a film chip is made dependent upon the read-out result.

It is also known that for specific purposes of handling data, analog and digital, it is convenient to mount film chips in a window of a data card of regular size to be used as "punched" card in data processing systems. The major space of this card is available for receiving and holding the usual "punched" card type information (punched holes, printed markers or the like) or receiving other types of encoded, preferably digitally encoded, information. The window contains a film chip bearing, for example analog or other type of information which can be identified by a specific code on the punched card. Such cards may be processed, for example, for purposes of searching or assembling certain groups of information as identified by codes, and the information on the film chip in the window of the punched card can then be used for any desired purpose.

It is undesirable to store film chips always in conjunction and physical proximity or connection with such a punched card. Specifically, unmounted film chips may pertain to a master file to be drawn on only when needed, and all information can be stored on microfilm directly, and in the image area thereof. On the other hand, for processing and usage of the content of a film chip, immediate handling is facilitated when associated digital data are susceptible to punched card processing permitting operations such as sorting or searching. Alternatively it may be desirable to facilitate normal handling, so that the card mount contains easily legible information without requiring enlargement. Thus, the need arises to transfer the image on a master-file film chip onto an originally unexposed copy film chip mounted on a punched card for further handling and usage, while the master file film chip is to be returned to the master file. The information on the master file film chips may at different times be used for different purposes and therefore requires, for example, different identification in a punched card or otherwise. Additionally, the occasion arises where the content of an unmounted master file film chip is to be used in a manner that requires preparation of more than one copy. Therefore, there is the need to provide at times punched cards with film chips having the information stored in a film chip in the master file.

The present invention relates, therefore, to such a system which permits the transfer of an image from a film chip onto an unexposed film chip mounted in a punched card, or vice versa if desired, in a very simple manner which permits rapid handling and copying without involving photographic camera-focusing type operations.

The inventive system further permits that one or more, i.e., any number copies of the content of a film chip can be provided in rapid succession on respectively one or more unexposed film chips mounted in punched cards. The system that forms a part of the invention includes a means for sequentially placing punched cards with unexposed film chips mounted in a window, into an upright position and adjacent the copy station proper. There are further means for the removal of such a card from this copying position. There is provided a pivotable platen for urging this unexposed, mounted film chip into juxtaposed position with the unmounted film chip bearing the image. The copy station proper is mounted in juxtaposed position to a transport drum of the type mentioned in the above-identified patents and capable of transporting a record carrier such as a film chip along its circumference. The copy station proper in accordance with the invention includes a means to scoop the film chip transported by such a drum from the drum. Guiding and reeling means place this film chip into copy position adjacent a window and also adjacent the above-mentioned platen. The unmounted film chip is then stopped in the copy station by an abutment stop. The mounted and unexposed film chips are thus placed into juxtaposition with the unmounted film chip bearing the image to be copied. The copy station further includes a lamp assembly for providing an exposure.

Whenever the film chip in the copy station is to be removed, its edge is cleared from the abutment and brought into engagement with a continuously running wheel for moving the film chip out of the photographing position and placing it into position so that the suction drum mentioned above can remove it completely from the copy station.

The advantages of this system are to be seen in that an unmounted film chip is placed into the photographing position at exactly the same speed with which it is transported by the drum. The time of operation is further shortened in that for placing a punched card into photographic position, i.e., juxtaposedly to the position the film chip has when in the copy station, the punched card simply has to be moved into an upright position. The punched cards can be fed into a pre-erecting position prior to any copy operation from which they can be erected individually and immediately preceding the photographing process itself. The principal advantage of the system offered is that by independent movements exposed and unexposed film chips are brought temporarily and only during the photographing procedure into a contacting position, so that exposure can be had simply by illumination without requiring any focusing or image production. Likewise, card feeding and film chip feeding devices permit independent removal of cards and film chips from the copy positions, so that more than one copy can be made from the film chip in the station.

While the specification concludes with claims particularly pointing out and distinctly claiming the subject matter which is regarded as the invention, it is believed that the invention, the objects and features of the invention, and further objects, features and advantages thereof will be better understood from the following description taken in connection with the accompanying drawing, in which:

FIGURE 1 illustrates in perspective view somewhat from the top the general layout of the inventive copying system;

FIGURE 2 illustrates a card of the nature used in the inventive copying system to receive a copy;

FIGURE 3 illustrates a top view of the copy station proper;

FIGURE 4 illustrates a perspective top view of the input guiding and reeling elements in the copy station shown in FIGURE 3;

FIGURE 5 illustrates a front view of the copy station in accordance with the invention;

FIGURE 7 illustrates a control surface for controlling the movement of the platen.

Figure 6:
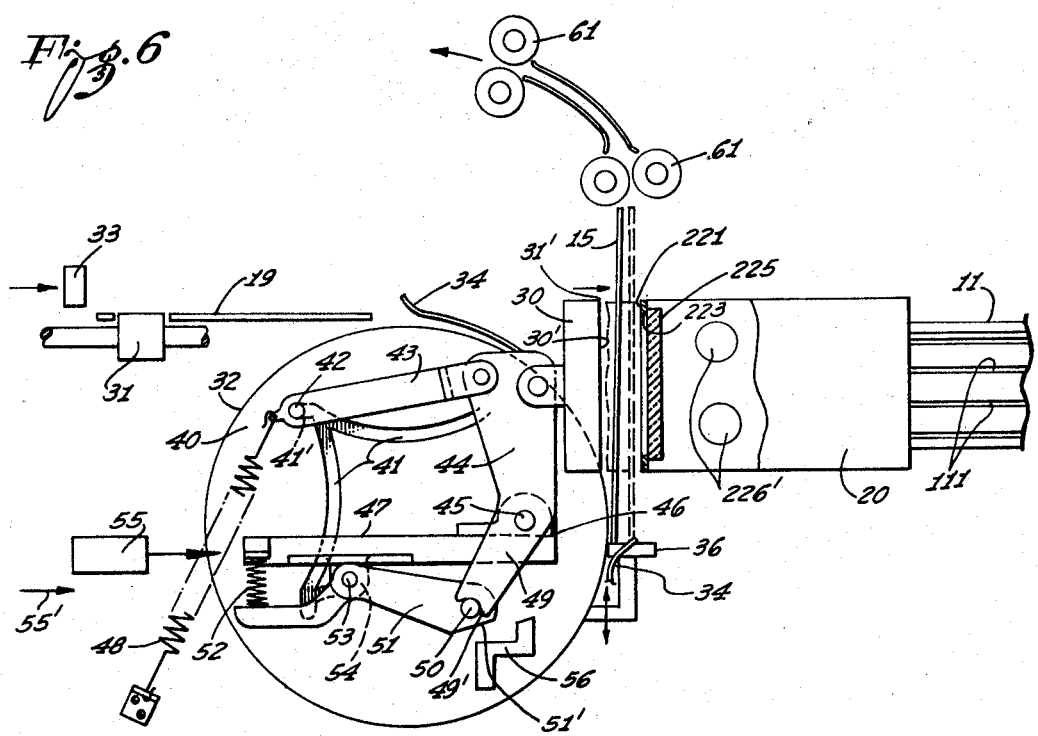
FIGURE 6 illustrates the principal components for platen and punched card movement and shown in relative position to the copy station proper.

Proceeding now to the detailed description of the drawings, in FIGURE 1 thereof there is shown in a perspective view the general layout of the copy station in accordance with the present invention. On a working or operating table 10 there is first mounted a transport drum 11 capable of high speed rotation and having along its circumference apertures connected through the interior of the drum to a vacuum pump. Thus, a film chip fed to the drum 11 is held by suction at the periphery of the drum and transported therewith. Drums of this type are, for example, disclosed in Patents 3,021,005; 3,023,894; 3,023,- 895; 3,032,750 and others. These drums serve to transport, for example, individual film chips within a larger processing unit in a manner analogous to the transport to and from a copy station 20. The copy station 20 is shown with its cover removed.

Film chip feeding and pickup devices are for example disclosed in the said patents as well as in copending application Serial No. 817,653 filed June 2, 1959, of common assignee. This latter application also discloses a transport drum of the nature referred to above. These patents further disclose various devices of controlling the path of a film chip past selected processing means. The drum 11 and the copy station 20 can well be understood as incorporable in systems of the nature disclosed in these patents.

Thus, drum 11 may, in general, pertain to a film chip distribution system of the type also disclosed in the above patents cooperating with processing and read-out devices for sorting and for controlling the sorting of individual film chips along particular paths as defined by a plurality of such vacuum type transport drums. For purposes of the present invention, the specific configuration of the film chip pick-up and film chip feeder devices is immaterial. It is of importance only that a film chip containing information to be copied will at times be placed in a position to be transported by this particular drum 11, and it is of further importance only that there be provided a pick-up device capable of receiving a film chip when leaving the copy station 20 via the drum 11.

It is thus understood that a film chip feeding device be arranged at the entrance side 20a of the copy station and that a film chip pick-up device be arranged at the exit side 20b of the copy station, and it may be noted that the placement of a film chip onto the drum for purposes of copying will normally be controlled by a computer (see FIGURE 8) possibly in cooperation with a film chip reading or monitoring device as disclosed in the above-identified references, and upon specific recognition of a particular film chip, the computer may cause cooperation of transport drum and guide means to place a film chip onto the drum 11.

Before describing the copy station 20 in detail, the transport mechanism for a card onto which a copy is to be made is to be described. Cards, for example, of the punched card type are stacked in an input hopper 14. The cards have a general configuration as shown in FIGURE 2. Such cards 15 have a general, a data storage area 16 to be provided, for example, with punched holes arranged in rows and columns as is well known for punched cards used for data processing. In addition, however, the card 15 has a window 17 in which is mounted a film chip 18.

The object of the process station presently described is to transfer the image on an unmounted film chip onto an unexposed film chip 18 in a card 15. The copying process, however, can be a reverse one, as was stated above. In order to facilitate the description of the invention, a device for the transfer of an image for a chip to a card such as 18 is described, but the principles involved permit a reverse image transfer.

Cards from input hopper 14 are fed individually onto a bed 19 by means of rollers such as 31 and rams in a manner well known for the feeding of individual punched cards. The feeding in direction of arrow 31' is terminated when the card has reached a position in which it abuts a guard rail 19'. This is the pre-copy position which is sensed by a sensing device 38 such as a photo cell, limit switch or the like. Normally, there is always a card in this position. Thus, the operation is such that initially a card is transported onto bed 19 and stays there in preparation for a copy to be made, and the first step for making a copy requires only removal of the card from bed 19 to the copy position. Removal of such card from bed 19 may result in an automatic replenishing of a storage card for the pre-copy position on bed 19. This is not part of the invention, and it is well understood, that a computer ocntrolling the inventive copying station can be programmed to always control feeding of a card into bed 19 when there is none, the absence and presence of a card being sensed by sensor 38.

Removal of a card from bed 19 is carried out by a solenoid or cam controlled ram 33 shifting the card under gripping fingers 34 on a drum wheel arrangement 32. The position of a card on bed 19 relative to fingers 34 and ram 33 can be seen best from FIGURE 6.

Upon rotation of the two wheels 32 the card is placed from the horizontal position into an upright position. Wheels 32 rotate in steps by 90° each, and there are four sets of such pairs of fingers 34 arranged at 90° angular displacement.

After a rotation by 90° of wheels 32, the card previously gripped by fingers 34 now stands upright which is the copying position. A limit switch 37 monitors this position. For removal of the card from the copying position, a lever 36 kicks the card upwardly to be gripped by the first ones of a set of continuously running rollers 61 to transport the card away for further processing. A card 15 is shown in FIGURE 1 in the roller train 61.

When the card is in the upright position, a platen 30 on a carriage 47 can be moved to urge the film chip 18 in window 17 of such card 15 against the film chip which in the meantime has arrived in the copy station 20.

The platen is controlled as follows. As was stated above, for removing the card from horizontal position on bed 19 to a standing or upright position adjacent the copy chamber 20, the wheels 32 are rotated by precisely 90° whereby the fingers 34 grip a card 15 when in horizontal position and pivot it by 90°. The front end of one of the wheels 32 has a guide plane or control surface 40 having a groove pattern which is comprised of four arcuate, shallow grooves 41 joined at a corner and each being continuous with a short slot 41'. FIGURE 7 illustrates the groove configuration in detail. Each slot 41' with one adjoining arcuate groove portion 41 defines a control path for a pin 42 to follow the movement of wheels 32. The pin 42 is positioned at one end of a double bent linking rod 43 which is pivotally linked with its other end to a platen support lever 44 carrying a platen 30. The lever 44 is a double arm lever pivoted at point 45 journaled in a bearing block 46 which is part of a carriage 47.

In the illustrated position in FIGURE 6, the pin 42 is urged into one of the slots 41' by means of a spring 48. In this position the platen 30 is in the upright position. The other arm of double arm lever 44 has a notch portion 49' engaging a pin 50 whenever the platen 30 is in the upright position. The pin 50 is mounted on a second double arm lever 51 which is biased by a spring 52 to urge the pin into the notch 49'.

Lever 51 is pivoted by a pivot pin 53 which is mounted in a bearing block 54 which is also a part of carriage 47. This carriage has normally the position as shown in FIGURE 6.

The carriage 47 can be moved, in the drawing of FIGURE 6 to the right (forward movement), by means of a solenoid 55. This control action occurs only when the platen is indeed in the upright position. When carriage 47 is moved forward, the pin 42 leaves slot 41' and drops into the adjoining, downwardly extending portion of groove 41. However, the arm 44 is inhibited from following this motion, i.e., the platen 30 remains in upright position because when carriage 47 moves forward, a control face 51' of lever 51 engages a stationary stop 56, thereby preventing pivoting of member 44 in counterclockwise direction. This forward movement of the carriage 47 brings the platen 30 into engagement with the film chip 18 of a punched card 15 which previously was placed into upright position by wheels 32. It should be mentioned that during the carriage movement the wheels 32 remain stationary so that indeed the card has remained in upright position.

As will also be described more fully below, the platen engages the film chip 18 in a punched card 15 during copying operation. When copying has been completed the solenoid 55 retracts. Thereby the control face 51' leaves the stop 56. The pin 42 now is guided under influence of the spring 48 into a continued downward position and link 43 folds or pivots arm 44 in a counterclockwise direction; platen 30 pivots back into a position in which its upper edge 30' clears the upper surface plane of bed 19. At this point of the operation, the lever 36 is actuated to push the card 15 in upward direction to be gripped by the first set of wheels 61 for transport out of the photographic position. The complete card erecting and platen movement operation is as follows: normally, platen 30 is folded back. First, a card 15 is pushed by ram 33 into position so that the crimped portion of fingers 34 grip along the lower edge margin of the card. Then the wheels 32 rotate whereby the card is erected and pin 42 runs in groove 41, so that the link 43 pushes lever 44 clockwise to erect the platen 30.

When the 90° movement of the wheels 32 has been completed, a slot 41' is then in a position to receive the pin 42 under the influence of spring 48 thereby locking platen 30 in upright position. This is in fact the position illustrated in FIGURE 6. The locking position is attained by having notch 49' receiving pin 50 to prevent counterclockwise movement of lever 51. The card has also assumed the upright or standing position with the film chip 18 thereof facing the platen 30 but clearing same because the carriage 47 is still retracted. When carriage 47 is moved forward, the surface 51' of lever 51 wedges under stop 56 so that the lever 44 cannot follow the "falling" movement of pin 42 and link 43. Subsequent retraction of the carriage 47 releases lever arm 49 to fold platen 30 back until another 90° step rotation by wheels 32.

Proceeding now to the description of the copy station, reference is made to FIGURE 1 and additionally to FIGURES 3, 4 and 5. The copy station comprises a base plate 21 bearing supporting posts 21' for a cover (not shown) to enclose the station. The posts 21' have been omitted in FIGURES 3 and 5 to facilitate orientation. On the base plate 21 there is mounted a first guide piece 211 having four fingers 212 which project into the grooves 111 of the drum 11 to scoop a film chip when adhering to the periphery of drum 11 by virtue of suction, from the drum. The film chip is then guided along the guiding surface 213 into a small and narrow groove 214 defined by two rail pieces 215 and 216. These rail pieces or guides 215 and 216 are mounted also on the base plate 21.

Since the drum has a high speed, for example, a circumferential speed of 300 inches per second, a considerable speed and momentum is imparted upon a film chip when scooped from the drum 11 by the fingers 212, so that the film chip moves by its own inertia along the groove 214 until being gripped by two shafts 217 and 218 having rubberized wheels 219 to grip the film chip with a minimum of friction. A central rubber wheel 219' on shaft 217 primarily serves for guiding the chip and prevents bending it without grip.

The two shafts 217 and 218 together with their rubber wheels are driven by a motor 22 mounted underneath the base plate 21, and through gearing 23 these shafts 217 and 218 rotate in opposite directions. The circumferential speed of wheels 219 is somewhat less than the circumferential speed of the drum 11. The film chip then moves into a narrow entrance opening defined between a front guide piece 220 and a backing member 222, and from there into the narrow space defined between backing member 222 and a mask plate 221.

The front mask plate 221 has an opening as a window 223 preferably being somewhat larger but still having comparable dimension with the image on the chip to be transferred. Of course, the window 223 is smaller in size than the film chip. The film chip is reeled by the wheels on the two shafts 217 and 218 into the gap or slot between the backing member 222 and the front mask 221 until the leading edge of the film chip abuts a stopping edge 224 which is an integral part of the front mask 221; the latter curves slightly in reverse direction as shown specifically in FIGURE 3. Of course, the film chip has to have such a dimension that, upon being stopped by the edge 224, its trailing edge has cleared the wheels 219 of the shafts 217 and 218.

The backing member 222 has a glass plate 225 aligned with the window 223. This defines the photographic area. A photoelectric cell, preferably a miniaturized combination package 26 of a photo diode or resistor and miniature lamp senses the arrival of the film chip in the photographing area. In the back of the backing member 222 is a light chamber 226 containing illumination sources 226' of suitable design permitting definite and short exposure times.

The front portion of the film chip is now in the range but clears the rubberized wheels 236 on another shaft 227 which is driven by a motor 24. If clearance is sufficient when the leading edge of the film chip abuts the edge 224, then the motor 24 may also be continuously running. Alternatively, the motor 24 may be controlled for on-off operation to be described more fully below for purposes of removing the chip from the operating area into which it was positioned previously.

A flat, cantilever 228 is pivotally mounted on a shaft 229 for actuation by a rotary solenoid 25. The rotary solenoid 25 pivots an arm 251 supporting a pin 252 which engages the lever 228 for pivoting same in direction of arrow 231 (FIGURE 3). The pin 252 projects through a slot 253 in plate 21 restricting the extent of permissible motion. Three rubberized wheels 232, 233 and 234 are coaxially mounted on the end of lever 228, and they are capable of independent and individual idler rotation.

The mask plate 221 has a slot 235 at its bent-off portion and it has upper and lower shoulders, permitting clearance by the wheels 233 and 234. Upon actuating the rotary solenoid 25, lever 228 is pivoted in such a manner that the wheel 233 can reach into the slot 225 and wheels 232 and 234 can reach respectively over and under the shoulders of this guide plate 221 to remove the leading edge of the film chip from the stop edge 224. The center wheel 233 merely serves to lift the center of the leading edge of the chip from stop edge 224 while wheels 232 and 234 additionally urge the film chip against the rubberized rollers or wheels 236 of shaft 227. The film chip is reeled only along its upper and lower edges for safeguarding the emulsion.

As soon as wheels 232 and 234 urge the film chip against running wheels 236, the film chip is reeled out of the photographing area. Thus, upon energization of the rotary solenoid 25, the film chip is transported again and its lower edge enters a slot 237 defined by two rail guides 238 and 239. The film chip is sufficiently long so that the shaft 227 driven by motor 24 can reel and transport the film chip up to a point where the leading edge and adjoining portions of the film chip enter the suction range of drum 11 defined at the end of the slot 237, whereupon the film chip is gripped by the drum 11 and removed completely from the copying station.

Figure 8:
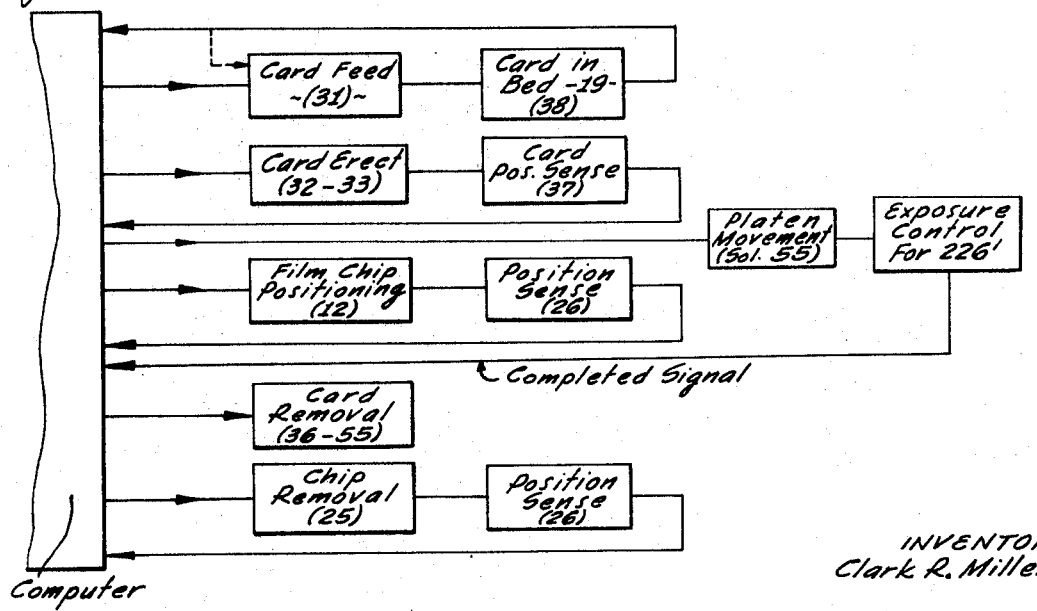
FIGURE 8 illustrates schematically a block diagram of the sequence of operation of the copy station as it is controlled by a computer.

FIGURE 8 illustrates schematically the overall operation of the system. Since the entire system is destined to operate on commands issued by a computer, no detailed circuit diagram is shown because every single step is controlled, initiated and sequenced by the computer. Nevertheless, the block diagram shown in FIGURE 8 will aid in the understanding of the overall operation of the inventive copy station.

As was stated above, the card feeder actuating rollers 31 serve for removing the card from the hopper 14 into the bed 19. This may be a complete autonomous unit in that it is simply controlled by the sensing switch or photo device 38. Whenever a card is not in the bed, the feeder is actuated to reel a card out of hopper 14 and to place the same in the bed 19. Alternatively, this portion may also be computer controlled in that the card feeder including rollers 31 position a card into bed 19 when so commanded by the computer. The sensing switch 38 always monitors the state of bed 19 and signals to the computer whenever a card has arrived in the bed 19, and it signals also when the card has been removed from the bed 19.

The operation proper requires juxtapositioning of a punched card 15, particularly of the unexposed film chip 18 therein, and of the unmounted film chip in copy station 20. The control of card and chip movement is to be an independent one, since more than one card may have to be prepared and photographed from a single film chip. Therefore, movements of punched card and of film chip are in part independent. The punched card is moved from bed 19 into its upright position as was described above, i.e., the ram 33 pushes the card into the grip of fingers 34 and the wheels 32 rotate in one step by 90° to place the card into upright position. When it arrives in that position the sensing switch, for example, microswitch 37 (FIGURE 1) signals the arrival of the card at the proper station to the computer. Concurrently thereto the platen 30 was erected in that pin 42 ran into groove 41 until entering notch 41' under the influence of spring 48 and rod 43 has pivoted arm 44 in clockwise direction so that platen 30 is positioned in upright position.

Concurrently thereto the computer issued a command signal to the chip feeder device 12 to place a chip onto suction drum 11. The drum 11 transports the chip circumferentially until being scooped from the periphery of drum 11 by the fingers 212 in copy station 20. The film chip enters groove 214 by its own inertia and is then gripped by the rubber wheels 219 and reeled in between mask plate 221 and the glass plate 225 of backing member 222 which is part of the light charmber 226. The movement of the chip is terminated as its leading edge abuts edge 224. The photo detector unit 26 signals arrival of the chip in the photographic position and signals the same back to the computer.

Now card and film chip are juxtaposed but not yet in photographic position because the platen is still not in engaging position. The computer issues an energization signal for solenoid 55 to push carriage 47 forward, whereby pin 42 leaves groove 41' and drops into the groove 41, but the lever 51 with its control surface 51' engages stop 56 thereby preventing arm 44 to follow the movement, and the platen 30 is pushed against one side of the film chip 18 in card 15 which is turn is pushed against the film chip as it is appears in the window 223 and mask 221. The pushing movement is to be sufficient to place the film chip 18 in the punched card 15 in juxtaposed and contacting position with the unmounted film chip station 20.

The exposure may also be controlled from the computer, in that a suitable switch either signals the arrival of the platen in position, or a limit switch actuated by the carriage 47 may cause the exposure lamp 226' to light up for the predetermined period of time determined by known timing devices which do not require elaborate description. The completion of the photographing is again signaled to the computer.

Now the computer will in any event issue a control signal causing the card 15 to be removed. This requires, of course, deenergization of solenoid 55 whereupon the carriage 47 is retracted, and the arm 51 under the influence of spring 52 pivots slightly, while pin 50 clears notch 49' and pin 42 drops further in groove 41 to release lever 44 to fold back platen 30 until clearing the plane of the bed 19. Concurrently, thereto the lever 36 is actuated, for example by way of cam control or by a separate solenoid, also controlled by the computer, to push the card 15 so that it can be gripped by wheels 61 to be reeled out of the photographing position.

The removal of the unmounted film chip from the copy station 20 depends on whether or not the same image is to be transferred to another punched card. If not, as decided by the computer, nothing will happen in the copy station 20 but the computer will issue another signal for removing another card from bed 19 to be placed in upright position, i.e., wheels 32 are rotated again by one step (90°), and the photographing process is repeated. This cycle repeats until the computer decides enough copies have been made, and the unmounted chip has to be removed from copy station 20. For purpose of removal of the chip, the computer issues a signal to energize the rotary solenoid 25 which when energized pivots arms 251, and the pin 252 thereof pivots lever 228, so that the wheels 232, 233 and 234 push the leading edge of the film chip from the edge 224, while in addition wheels 232 and 234 cause upper and lower edge of the film chip to engage wheels 236 which are continuously driven by motor 24. Now the film chip is reeled out of the photographing position and runs in a slot 237 until being gripped by the drum 11 and to be placed by computer control into the chip output device.

The invention is not limited to the embodiment described above, but all changes and embodiments thereof not constituting departures from the spirit and scope of the invention are intended to be covered by the following claims.

1. A copy system for transferring an image on a film chip onto an unexposed film chip, one of said film chips being mounted in a window of a card, the other one of said film chips being unmounted, comprising:
   a rotatable drum capable of retaining an unmounted photographic film chip on its periphery;
   first guide means for scooping said chip from said drum;
   roller means for progressing said chip when entering said guide means;
   a second guide means positioned to place the chip reeled by said roller means into an operating position at one side of said second guide means, there being a window in said second guide means;
   means for placing a second film chip mounted in a card juxtaposedly to said window at the other side of said second guide means;
   illuminating means for causing transfer of image information from one chip to the other one;
   reeling means for reeling said first film chip from said second guide means;
   a third guide means for guiding said first chip from said reeling means toward said drum for removal thereof from said third guide means; and
   means for removing said card with mounted film chip.

2. A copy station wherein information on a first film chip is photographically transferred to a second, unexposed film chip, one of said film chips being mounted on a card, and the other one of said film chips being unmounted, comprising:
   illuminating means positioned to provide exposure of said second film chip for information transfer from said first film chip;
   means for reeling said unmouted film chip in juxtaposition to said illuminating means;
   means for pivoting said card so that said mounted film chip is juxtapositioned to said unmounted film chip when at said illuminating means;
   means for providing temporary engagement of said two film chips; and
   means for independently removing said film chips from said juxtapositions.

3. A copy station for copying the image on a film chip onto an unexposed film chip, one of said film chips being mounted on a card of the punched card type, the other film chip being unmounted, the combination comprising:
   an illuminating chamber having a window;
   means for placing said card in position relative to said window so that said mounted film chip faces said window;
   guiding and reeling means for placing an unmounted film chip relative to said window and juxtaposed to said mounted film chip;
   a platen positioned for urging said mounted and unmounted film chips into engaging position relative to said window;
   and means for independently removing said card and said unmounted film chip along a path different from the path of placement relative to said window.

4. A copy station for transferring the image on a film chip to an unexposed film chip, one of said film chips being mounted on a card of the punched card type, the other film chip being unmounted, the combination comprising:
   an illuminating chamber having a window covered by a transparent plate;
   a mask having a window aligned with said plate covered window and defining a narrow slit with said plate,
   said windows having positions permitting alignment with a mounted film chip;
   first reeling means for reeling an unmounted chip into said slot and into alignment with said windows;
   stop means for retaining said unmounted chip in said aligned position;
   release means for lifting said chip from said stop means; and
   second reeling means for reeling said unmounted film chip out of said slot.

5. A copy station for transferring the image on a film chip to an unexposed film chip, one of said film chips being mounted on a card of the punched card type, the other film chips being unmounted, said copy station positioned adjacent a rotating transport drum transporting at its circumference unmounted film chips of the combination, comprising:
   an illuminating chamber having a window covered by a transparent plate;
   a mask having a window aligned with said plate covered window and defining a narrow slit with said plate,
   said windows having positions permitting alignment with a mounted film chip;
   finger means for scooping a film chip from said drum;
   guiding means juxtaposed to said finger means for pushing said chip toward said slit;
   first reeling means for reeling an unmounted chip into said slot and into alignment with said window;
   stop means for retaining said unmounted chip in said aligned position;
   release means for lifting said chip from said stop means; and
   guide means for guiding said film chips when reeled by said second reeling means towards said drum.

6. In a data processing system, wherein film chips progress along paths defined by rotating suction drums capable of peripherally retaining such film chips, a copy station comprising:
   first guide means for removing a film chip from a suction drum;
   second guide means for placing a film chip into vicinity of such suction drum for removal therewith;
   an illumination chamber with window placed in between said first and second guide means, said window extending along and defining a path for a film chip in between said first and second guide means;
   first means for advancing said film chip when in said first guiding means to place such film chip into alignment with said window;
   stop means for retaining said film chip in said alignment position;
   a controlled cantilever to remove said film chip from said stop means; and second advancing means for transporting said film chip to said second guide means when said cantilever has removed said chip from said stop means.

7. In a data processing system, wherein film chips progress along paths defined by rotating suction drums capable of peripherally retaining such film chips, a copy station comprising:
first guide means for removing a film chip from a suction drum;
second guide means for placing a film chip into vicinity of such suction drum for removal therewith;
an illumination chamber with window placed in between said first and second guide means, said window extending along and defining a path for a film chip in between said first and second guide means; and
controllable means for advancing said film chip from said first to said second guide means, permitting stopping when said film chip faces said window.

8. In a data processing system, wherein film chips progress along paths defined by rotating suction drums capable of peripherally retaining such film chips, a copy station comprising:
first guide means for removing a first film chip from a suction drum;
second guide means for placing a first film chip into vicinity of such suction drum for removal therewith;
an illumination chamber with window placed in between said first and second guide means, said window extending along and defining a path for a first film chip in between said first and second guide means;
controllable means for advancing said film chip from said first to said second guide means, permitting stopping when said first film chip faces said window;
means for placing a second film chip in juxtaposition to said first film chip when facing said window; and
means for placing said first and second film chips into mutually contacting positions at said window.

9. In a data processing system, wherein film chips progress along paths defined by rotating suction drums capable of peripherally retaining such film chips, a copy station comprising:
first guide means for removing a film chip from a suction drum;
second guide means for placing a film chip into vicinity of such suction drum for removal therewith;
an illumination chamber with window placed in between said first and second guide means, said window extending along and defining a path for a film chip in between said first and second guide means;
controllable means for advancing said film chip from said first to said second guide means and including means for stopping said film chip when facing said window; and
release control means for overriding said stopping means.

10. In a copy station wherein information on a first film chip is photographically transferred to a second, unexposed film chip, one of said film chips being mounted on a card to be transported into an operating plane at the copy station, and the other one of said film chips being transported to the copy station by a continuously running transfer medium, the combination comprising:
means for scooping said other film chip from said transfer medium and guiding it towards said operating plane to said juxtaposition to said chip on said card;
releasable stop means for retaining said other chip at said operating plane when juxtaposed to said chip on the card;
illuminating means positioned to provide exposure of said second film chip for information transfer from said first film chip;
means for operating said releasable stop means;
and means for reeling said other film chip when released from said stop means towards said transfer medium to be removed therewith.

11. In combination for transferring an image on a first film chip to an exposed film chip,
a transfer station for receiving the first film chip and the unexposed film chip in image-transferring relationship in a first plane to provide for the transfer of the image from the film chip to the unexposed film chip,
means disposed relative to the first film chip and the unexposed film chip for obtaining the transfer of the image on the first film chip to the unexposed film chip upon the disposition of the chips in the transfer station in the image-transferring relationship,
means disposed relative to a particular one of the first and unexposed film chips for leading that film chip into the transfer station in the first plane,
means disposed relative to the other one of the first and unexposed film chips for leading the other film chip into the transfer station in a second plane transverse to the first plane, and
means responsive to the movement of the other film chip into the transfer station for carrying the other film chip from the second plane into the image-transferring relationship to the particular one of the first and unexposed film chips.

12. The combination set forth in claim 11, including,
means responsive to the transfer of the image from the first film chip to the unexposed film chip for leading the particular film chip from the transfer station in the first plane, and
means responsive to the transfer of the image from the first film chip to the unexposed film chip for carrying the other film chip from the image-transferring relationship to the second plane.

13. In combination for transferring an image on a first film chip to an unexposed film chip,
means for providing a continuous transport of the first film chip at a relatively high speed,
a copy station for receiving the first film chip and the unexposed film chip in image-copying relationship in a first plane to provide for the copy of the image from the first film chip to the unexposed film chip,
means disposed relative to the transport means for transferring the first film chip from the transport means to the copy station and for stopping the first film chip at the copy station,
means disposed relative to the unexposed film chip for transferring the unexposed film chip to the copy station in image-copying relationship to the first film chip, and
means for obtaining the copy of the image on the first film chip to the unexposed film chip upon the disposition of the first film chip and the unexposed film chip in image-copying relationship in the copy station.

14. The combination set forth in claim 13, including,
means responsive to the copy of the image on the first film chip to the unexposed film chip for obtaining a return of the first film chip to the transport means, and
means responsive to the copy of the image on the first film chip to the unexposed film chip for obtaining a transfer of the unexposed film chip from the copy station.

15. In combination for transferring an image on a first film chip to an unexposed film chip,
a copy station for receiving the first film chip and the unexposed film chip in image-copying relationship to provide for the copy of the image from the first film chip to the unexposed film chip,
means for obtaining the copy of the image on the first film chip to the unexposed film chip upon the disposition of the first film chip and the unexposed film chip in image-copying relationship in the copy station, means for providing a continuous transport of the first film chip at a relatively high speed, means disposed relative to the copy station and the transport means and responsive to the copy of the image on the first film chip to the unexposed film chip for obtaining a transfer of the first film chip from the copy station to the transport means, and means disposed relative to the copy station and responsive to the copy of the image on the first film chip to the unexposed film chip for obtaining a transfer of the unexposed film chip from the copy station.

16. The combination set forth in claim 15 wherein the transport means are movable in closed loops and wherein the transfer means for the unexposed film chip is operative to pivot the unexposed card from the image-copying position to a position transverse to the image-copying position.

17. In combination for transferring an image on a first film chip to an unexposed film chip, transport means constructed to provide a movement of the first chip in a closed loop, a copy station for holding the first film chip and the unexposed film chip in image-copying relationship to provide for a copy of the image on the first film chip to the unexposed film chip, means disposed relative to the transport means for obtaining a transfer of the first film chip from the transport means to the copy station for the copy of the image on the first film chip to the unexposed film chip, means disposed relative to the copy station for obtaining a transfer of the unexposed film chip to the copy station in image-copying relationship to the first film chip, and means responsive to the disposition of the first film chip and the unexposed film chip in image-copying relationship in the copy station for obtaining a copy of the image of the film chip on the unexposed film chip.

18. The combination set forth in claim 17, including, means responsive to the copy of the image on the first film chip to the unexposed film chip for obtaining a return of the first film chip from the copy station to the transport means, and means responsive to the copy of the image on the first film chip to the unexposed film chip for obtaining a transfer of the unexposed film chip from the copy station.

19. In combination for transferring an image on a first film chip to an unexposed film chip, transport means constructed to provide a movement of the first film chip in a closed loop, a copy station for receiving the first film chip and the unexposed film chip in image-copying relationship to provide for the copy of the image from the first film chip to the unexposed film chip, illuminating means for illuminating the image of the first film chip on the unexposed film chip to obtain the copy of the image on the first film chip to the unexposed film chip upon the disposition of the first film chip and the unexposed film chip in image-copying relationship in the copy station, means disposed relative to the copy station and the transport means and responsive to the copy of the image on the first film chip to the unexposed film chip for obtaining a transfer of the first film chip from the copy station to the transport means, and means disposed relative to the copy station and responsive to the copy of the image on the first film chip to the unexposed film chip for obtaining a transfer of the unexposed film chip from the copy station.

20. The combination set forth in claim 19 wherein the last mentioned means include means for rotating the unexposed film chip from the image-copying position to a transverse position and means for moving the unexposed film chip from the copy station in a direction corresponding to the transverse position.

21. In combination for transferring an image on a first film chip to an unexposed film chip, a copy station constructed to hold the first film chip and the unexposed film chip in image-copying relationship for a copy of the image on the first film chip to the unexposed film chip, transport means constructed to obtain a transport of the first film chip on a continuous basis in a closed loop, means disposed relative to the transport means for obtaining a removal of the first film chip from the transport means, guide means disposed relative to the last mentioned means for guiding toward the copy station the first film chip removed from the transport means, stop means disposed relative to the guide means and the copy station for stopping the first film chip at the copy station in the image-copying position, means disposed relative to the copy station for transferring the unexposed film chip to the image-copying position in the copy station, and means disposed relative to the first film chip and the unexposed film chip for copying the image on the first film chip to the unexposed film chip upon the disposition of the first film chip and the unexposed film chip in the image-copying relationship.

22. The combination set forth in claim 21, including, guide means disposed relative to the copy station for transferring the first film chip from the copy station upon the copy of the image on the unexposed film chip, means disposed relative to the last mentioned guide means for transferring the first film chip from such guide means to the transport means, and means disposed relative to the copy station for transferring the unexposed film chip from the copy station upon the copy of the image on the unexposed film chip.

23. In combination for copying an image on a first film chip to an unexposed film chip, a copy station for receiving the first film chip and the unexposed film chip in image-copying relationship to provide for a copy of the image on the first film chip to the unexposed film chip, means for transferring the unexposed film chip to the copy station, means disposed relative to the last mentioned means and to the copy station for pivoting the unexposed film chip to the image-copying position, means disposed relative to the copy station for transferring the first film chip to the image-copying position, and means for obtaining a transfer of the image on the first film chip to the unexposed film chip upon the disposition of the first film chip and the unexposed film chip in the image-copying positions.

24. The combination set forth in claim 23, including, means disposed relative to the copy station for pivoting the unexposed film chip from the image-copying position upon the copy of the image on the unexposed film chip, means disposed relative to the last mentioned means for transferring the unexposed film chip from the copy station upon such pivoting of the unexposed film chip, and means disposed relative to the copy station for transferring the first film chip from the copy station upon the copy of the image on the unexposed film chip.

25. In combination for copying an image on a first film chip to an unexposed film chip, a copy station for receiving the first film chip and the unexposed film chip in image-copying relationship to provide for a copy of the image on the first film chip to the unexposed film chip, means disposed relative to the copy station for obtaining a transfer of the image on the first film chip to the unexposed film chip upon the disposition of the first film chip and the unexposed film chip in the image-copying positions, means responsive to the copy of the image on the first film chip to the unexposed film chip for pivoting the unexposed film chip from the copy station, means responsive to the pivoting of the unexposed film chip for obtaning a transfer of the unexposed film chip from the copy station, and means responsive to the copy of the image on the first film chip to the unexposed film chip for transferring the first film chip from the copy station.

26. The combination set forth in claim 25 wherein transport means are constructed to obtain a continuous movement of the first film chip in a closed loop and wherein the transfer means for the first film chip are constructed and are disposed relative to the transport means and the copy station to obtain a transfer of the first film chip from the copy station to the transport means upon the copy of the image on the first film chip to the unexposed film chip.

References Cited
UNITED STATES PATENTS

| | | | |
|---|---|---|---|
| 3,116,675 | 1/1964 | Trimble | 95—73 |
| 3,237,544 | 3/1966 | Nelson | 95—76 |

NORTON ANSHER, *Primary Examiner.*

R. A. WINTERCORN, *Assistant Examiner.*